No. 660,710. Patented Oct. 30, 1900.
W. C. OSWALD.
RUNNER ATTACHMENT.
(Application filed July 11, 1899.)
(No Model.)
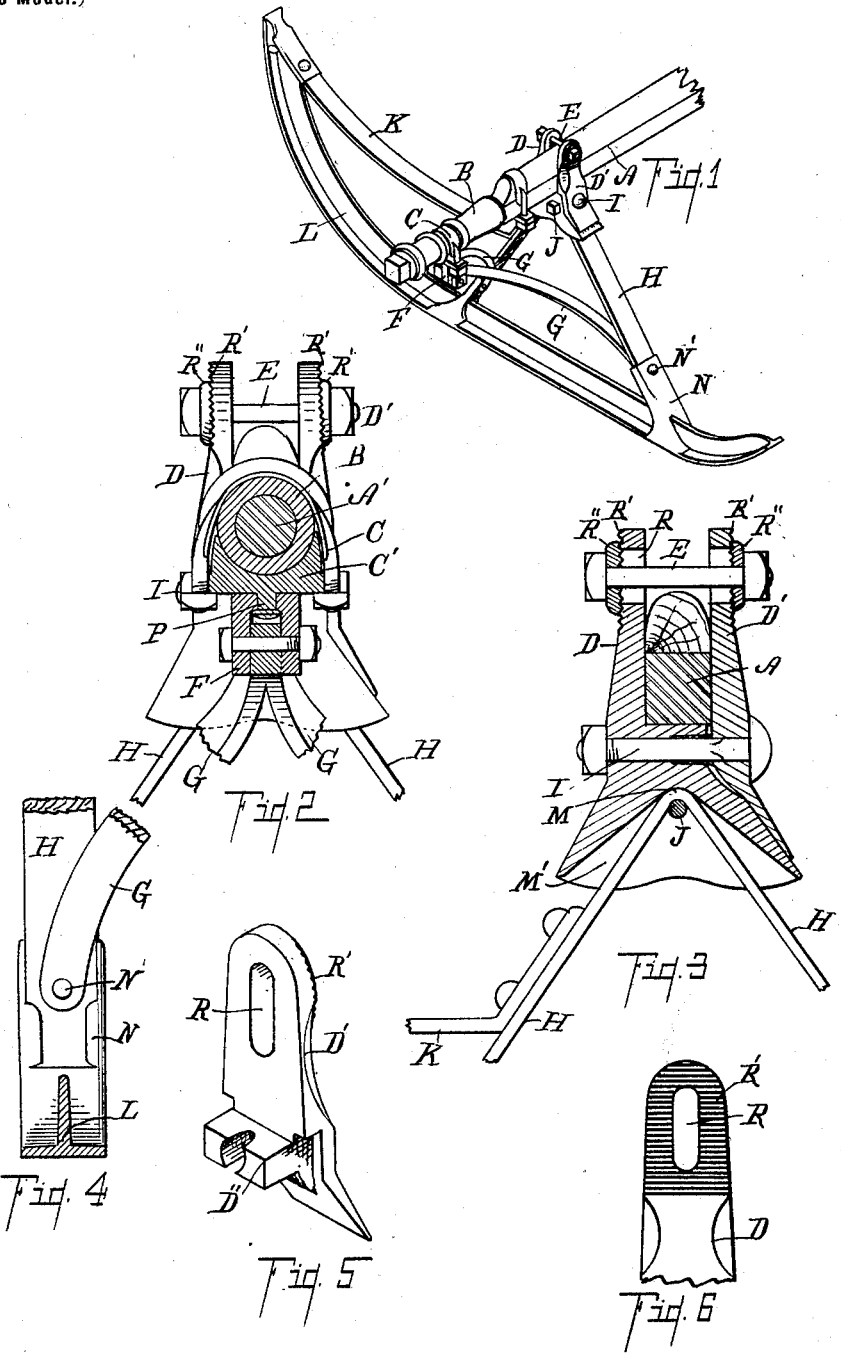
Witnesses:
Otis A. Earl
Cassa M. Chappell
Inventor,
William C. Oswald
By Fred L. Chappell
Atty.

UNITED STATES PATENT OFFICE.

WILLIAM C. OSWALD, OF KALAMAZOO, MICHIGAN, ASSIGNOR TO THE KALAMAZOO WAGON COMPANY, OF SAME PLACE.

RUNNER ATTACHMENT.

SPECIFICATION forming part of Letters Patent No. 660,710, dated October 30, 1900.

Application filed July 11, 1899. Serial No. 723,511. (No model.)

*To all whom it may concern:*

Be it known that I, WILLIAM C. OSWALD, a citizen of the United States, residing at the city of Kalamazoo, in the county of Kalamazoo and State of Michigan, have invented certain new and useful Improvements in Runner Attachments, of which the following is a specification.

This invention relates to improvements in sled-runners for attachment to the axles of wheel-vehicles to convert them into sleighs.

The objects of this invention are, first, to provide an inexpensive and efficient sleigh-runner which can be attached to the axles of light vehicles; second, to provide an improved clamp which shall be joined rigidly to the axle and yet afford a pivotal connection for the runner, so that it can rock a considerable distance to increase the effectiveness of the device; third, to provide a construction of clamp for use in this connection that is very easy to manufacture and at the same time neat and pleasing in appearance when attached to the axle of a vehicle and which shall not mar or damage the axle in any way, and, fourth, to provide an improved double pivotal connection for a runner and its brace of the class described, so that it will pivot freely within the desired limits.

Further objects will definitely appear in the detailed description to follow.

I accomplish the objects of my invention by the devices and means described in this specification.

The invention is clearly defined and pointed out in the claims.

A structure embodying my invention is fully illustrated in the accompanying drawings, forming a part of this specification, in which—

Figure 1 is a detail perspective view of my improved runner attached to the axle of a vehicle. Fig. 2 is a detail sectional view through the pivotal connection of the runner-braces to the axle. Fig. 3 is an enlarged detail transverse sectional view through the main clamp which secures the runner pivotally to the axle of the vehicle. Fig. 4 is a detail view of the joint between the knee, the brace, and the runner. Fig. 5 is an enlarged detail sectional view of the member D' of the main clamp. Fig. 6 is an enlarged detail view of the exterior of one of the clamp members, showing the corrugations.

In the drawings similar letters of reference refer to similar parts throughout the several views.

Referring to the lettered parts of the drawings, A is the axle of a vehicle, of which A' is the axle-spindle. B is a sleeve placed on the axle to protect the same when the runner is in place. The runner proper is made of a piece of T-steel L and has a brace or knees H H and a rave K, extending from the nose to the knee or brace H. The knees or braces H are made of a single continuous piece bent into an A shape, the lower ends of which are secured to the runner D by means of brackets N, as clearly appears in Figs. 1 and 4.

To the lower ends of knees H are secured braces G on pivots N'. These extend upwardly and outwardly and are secured to a bracket F by suitable bolts therethrough. The bracket F is pivoted on the pivot P to the under side of a clip-plate C', which is secured by a clip-bolt C to the sleeve B on the axle-spindle A'. The braces H at angle M are retained in the clamp member D by the transverse bolt J, which serves to retain the same in position. The seat M' for the braces or knees H allows the rocking of the runner on the axle, as the seat is open at a wider angle than that formed at M in the braces or knees H.

The members D and D' of the clamp are perforated to receive a suitable bolt I, which extends therethrough and beneath the axle A, and are also perforated by slot R to receive the bolt E above the axle A, which clamps the same securely from both sides and makes the clamp adjustable, so that it may be securely clamped upon axles of different sizes. The exterior of the members D D' are corrugated at R' to receive corrugated washers R" to retain the bolt E securely and allow the same to be arranged close above the wood of the axle without danger of slipping. The member D' has a tenon D" extending into a mortise in the base of the main member D to give the structure additional strength and to properly locate the two members in relation to each other and to the axle.

Having thus described my invention, what I claim as new, and desire to secure by Letters Patent, is—

1. In a runner attachment for vehicles, the combination of the runner L; an A-shaped brace or knees H, forming an angle M, at the top; a rave K, extending from the nose of the runner to the braces; a clamp consisting of a principal member D, having a seat M', in the under side, opening at a wider angle than the angle M, of the brace or knees; a second member D', with a tenon to fit in a mortise in the first member; bolts to secure the same to the axle; a transverse bolt J, extending through the angle M, of the braces H, to retain the same in the seat M'; braces G, G, pivoted at N', toward a sleeve B, on the axle-spindle A', the lower ends of the braces H, extending upwardly and outwardly; a bracket F, to which said braces G, are secured; a clip-plate C', with a pivot to engage and retain the bracket F; and a clip C, to attach plate C', to the sleeve B, all coacting together substantially as described for the purpose specified.

2. In a runner attachment for vehicles, the combination of a runner; an A-shaped brace or knee therefor; a clamp for the axle having a main member which has an integral portion extending beneath the said axle, containing a seat for the said A-shaped brace or knee opening at a wider angle than the angle of said brace or knee; and a pivot extending through the A-shaped brace or knee and an auxiliary second member for said clamp, which, with the said main member embraces the axle, for the purpose specified.

3. In a runner attachment for vehicles, the combination of a runner, a main clamp; a pivotal connection between the main clamp and the runner; a sleeve for the axle; lateral braces for the runner extending upwardly and outwardly and connected to a small bracket; a clip, the plate of which has a pivot for the attachment of the bracket, all coacting as specified.

In witness whereof I have hereunto set my hand and seal in the presence of two witnesses.

WILLIAM C. OSWALD. [L. S.]

Witnesses:
 CASSA M. CHAPPELL,
 OTIS A. EARL.